United States Patent
Zhamu et al.

(10) Patent No.: US 9,481,576 B2
(45) Date of Patent: Nov. 1, 2016

(54) ENVIRONMENTALLY BENIGN PRODUCTION OF GRAPHENE MATERIALS

(71) Applicants: Aruna Zhamu, Springboro, OH (US); Bor Z Jang, Centerville, OH (US)

(72) Inventors: Aruna Zhamu, Springboro, OH (US); Bor Z Jang, Centerville, OH (US)

(73) Assignee: Angstron Materials, Dayton, OH (US)

( * ) Notice: Subject to any disclaimer, the term of this patent is extended or adjusted under 35 U.S.C. 154(b) by 0 days.

(21) Appl. No.: 14/544,821

(22) Filed: Feb. 24, 2015

(65) Prior Publication Data

US 2016/0244333 A1    Aug. 25, 2016

(51) Int. Cl.
    *C01B 31/04*     (2006.01)
    *C25B 1/00*     (2006.01)

(52) U.S. Cl.
    CPC ....... *C01B 31/0469* (2013.01); *C01B 31/0423* (2013.01); *C25B 1/00* (2013.01)

(58) Field of Classification Search
    CPC .......... C01B 31/0415; C01B 31/0423; B82Y 40/00; C25B 1/00
    See application file for complete search history.

(56) References Cited

U.S. PATENT DOCUMENTS

| | | |
|---|---|---|
| 6,872,330 B2 | 3/2005 | Mack et al. |
| 7,071,258 B1 | 7/2006 | Jang et al. |
| 8,114,375 B2 * | 2/2012 | Jang et al. ............... 423/448 |

OTHER PUBLICATIONS

Skowroński, J. M. "Exfoliation of graphite-CrO3 intercalation compounds in hydrogen peroxide solution." Journal of materials science 23.6 (1988): 2243-2246.*
Zhou, Ming Shan, and Jian Cai Xia. "Preparation and characterization of the C2H5COOH-graphite intercalation compound." Advanced Materials Research. vol. 734. 2013.*
Mao, Wenqu, et al. "Effects of the oxidation treatment with K 2 FeO 4 on the physical properties and electrochemical performance of a natural graphite as electrode material for lithium ion batteries." Electrochemistry communications 8.8 (2006): 1326-1330.*
U.S. Appl. No. 10/858,814, filed Jun. 3, 2004, B. Z. Jang, et al.
Bor Z. Jang and A Zhamu, "Processing of Nano Graphene Platelets (NGPs) and NGP Nanocomposites: A Review," J. Materials Sci. 43 (2008) 5092-5101.
Yang, et al. "Tow-dimensional Graphene Nano-ribbons," J. Am. Chem. Soc. 130 (2008) 4216-17.

* cited by examiner

*Primary Examiner* — Richard M Rump (57) ABSTRACT

An intercalated graphite compound composition, comprising a layered graphite with interlayer spaces or interstices and an intercalant residing in at least one of said interstices, wherein said intercalant comprises a carboxylic acid and an oxidant selected from $Li_2FeO_4$, $Na_2FeO_4$, $K_2FeO_4$, $Li_xCoO_4$, $Na_xCoO_4$, $K_xCoO_4$, $Li_xNiO_4$, $Na_xNiO_4$, $K_xNiO_4$, or a combination thereof. This compound can be produced in an environmentally benign process. The compound can be further treated to produce separate graphene sheets.

20 Claims, 6 Drawing Sheets

ENVIRONMENTALLY BENIGN PRODUCTION OF GRAPHENE MATERIALS

FIELD OF THE INVENTION

The present invention relates to a method of producing graphene materials, including pristine graphene, graphene oxide, graphene fluoride, and functionalized graphene. This environmentally benign method avoids the use of undesirable chemicals, such as concentrated sulfuric acid, nitric acid, heavy metal ion-producing oxidants (e.g. potassium permanganate, $KMnO_4$ that produces $Mn^{+2}$), and halogen-producing chemicals (e.g. sodium perchlorate, $NaClO_3$ that produces $Cl_2$ gas).

BACKGROUND

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, hydrogenated graphene, and chemically functionalized graphene.

Graphene materials or NGPs have been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nano filler in a composite material and an electrode material in energy storage devices is imminent. The availability of graphene sheets produced in large quantities in an environmentally benign manner is essential to the success in exploiting composite, energy, and other applications for graphene.

Our research group was among the first to discover graphene [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. The processes for producing NGPs and NGP nanocomposites were recently reviewed by us [Bor Z. Jang and A Zhamu, "Processing of Nano Graphene Platelets (NGPs) and NGP Nanocomposites: A Review," J. Materials Sci. 43 (2008) 5092-5101]. Four main prior-art approaches have been followed to produce NGPs. Their advantages and shortcomings are briefly summarized as follows:

Approach 1: Chemical Formation and Reduction of Graphite Oxide (GO) Platelets

The first approach (FIG. 1) entails treating natural graphite powder with an intercalant (e.g., concentrated sulfuric acid) and an oxidant (mixture of nitric acid and potassium permanganate, respectively) to obtain a graphite intercalation compound (GIC) or, actually, graphite oxide (GO). Prior to intercalation or oxidation, graphite has an inter-graphene plane spacing of approximately 0.335 nm ($L_d=\frac{1}{2} d_{002}=0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultra-sonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this chemical production process:

(1) The process requires the use of large quantities of several undesirable chemicals, such as sulfuric acid, nitric acid, and potassium permanganate (generating heavy metal ions, $Mn^{+2}$), and/or sodium perchlorate (generating undesirable chlorine gas during reactions).
(2) The chemical treatment process requires a long intercalation and oxidation times, typically 5 hours to five days.
(3) Strong acids consume a significant amount of graphite during this long intercalation/oxidation process by "eating their way into the graphite" (converting graphite into carbon dioxide, which is lost in the process). It is not unusual to lose 20-50% by weight of the graphite material immersed in strong acids and oxidizers.
(4) The thermal exfoliation requires a high temperature (typically 800-1,050° C.) and, hence, is a highly energy-intensive process.
(5) Both heat- and solution-induced exfoliation approaches require a very tedious washing and purification step. For instance, typically 2.5 kg of water is used to wash and recover 1 gram of GIC, producing huge quantities of waste water that need to be properly treated.
(6) In both the heat- and solution-induced exfoliation approaches, the resulting products are GO platelets that must undergo a further thermal or chemical reduction treatment to reduce the oxygen content. Typically, even after reduction, the electrical conductivity of GO platelets remains much lower than that of pristine graphene. Furthermore, the reduction procedure often involves the utilization of toxic chemicals, such as hydrazine.
(7) Furthermore, the quantity of intercalation solution retained on the flakes after draining may range from 20 to 150 parts of solution by weight per 100 parts by weight of graphite flakes (pph) and more typically about 50 to 120 pph. During the high-temperature exfoliation, the residual intercalate species retained by the flakes decompose to produce various species of sulfuric and nitrous compounds (e.g., $NO_x$ and $SO_x$), which are undesirable. The effluents require expensive remediation procedures in order not to have an adverse environmental impact.

The present invention was made to address these issues.

Approach 2: Direct Formation of Pristine Nano Graphene Platelets

In 2002, our research team succeeded in isolating single-layer and multi-layer graphene sheets from partially carbonized or graphitized polymeric carbons, which were obtained from a polymer or pitch precursor [[B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. Mack, et al ["Chemical manufacture of nanostructured materials" U.S. Pat. No. 6,872,330 (Mar. 29, 2005)] developed a process that involved intercalating graphite with potassium melt and contacting the resulting K-intercalated graphite with alcohol, producing violently exfoliated graphite containing NGPs. The process must be carefully conducted in a vacuum or an extremely dry glove box environment since pure alkali metals, such as potassium and sodium, are extremely sensitive to moisture and pose an explosion danger. This process is not amenable to the mass production of NGPs.

Approach 3: Epitaxial Growth and Chemical Vapor Deposition of Nano Graphene Sheets on Inorganic Crystal Surfaces Small-scale production of ultra-thin graphene sheets on a substrate can be obtained by thermal decomposition-based epitaxial growth and a laser desorption-ionization technique. Epitaxial films of graphite with only one or a few atomic layers are of technological and scientific significance due to their peculiar characteristics and great potential as a device substrate. However, these processes are not suitable for mass production of isolated graphene sheets for composite materials and energy storage applications.

Approach 4: The Bottom-Up Approach (Synthesis of Graphene from Small Molecules)

Yang, et al. ["Tow-dimensional Graphene Nano-ribbons," J. Am. Chem. Soc. 130 (2008) 4216-17] synthesized nano graphene sheets with lengths of up to 12 nm using a method that began with Suzuki-Miyaura coupling of 1,4-diiodo-2,3,5,6-tetraphenyl-benzene with 4-bromophenylboronic acid. The resulting hexaphenylbenzene derivative was further derivatized and ring-fused into small graphene sheets. This is a slow process that thus far has produced very small graphene sheets in very small quantities.

Hence, an urgent need exists for a graphene production process and an intermediate product (i.e. an intercalated compound) that require a reduced amount of undesirable chemicals (e.g. $KMnO_4$-free and $KClO_3$-free), shortened process time, less energy consumption, lower degree of graphene oxidation, reduced or eliminated effluents of undesirable chemical species into the drainage (e.g., sulfuric acid) or into the air (e.g., $SO_2$ and $NO_2$). The process should be able to produce more pristine (less oxidized and damaged), more electrically conductive, and larger/wider graphene sheets.

SUMMARY OF THE INVENTION

The present invention provides a strikingly simple, fast, scalable, environmentally benign, and cost-effective method that meets the aforementioned needs. This method is used to produce a unique intercalated graphite compound that can be readily converted into exfoliated graphite or separate sheets of graphene from a graphitic or carbonaceous material.

In a preferred embodiment, the instant invention provides an intercalated graphite compound for the production of exfoliated graphite, flexible graphite, or nano graphene platelets. The intercalated compound comprises a layered graphite with interlayer spaces or interstices and an intercalant and/or its component ions (e.g. $Na^{+1}$ or $FeO_4^{+2}$) residing in at least one of the interstices, wherein the intercalant comprises a carboxylic acid or citric acid and an oxidant selected from $Li_2FeO_4$, $Na_2FeO_4$, $K_2FeO_4$, $Li_xCoO_4$, $Na_xCoO_4$, $K_xCoO_4$, $Li_xNiO_4$, $Na_xNiO_4$, $K_xNiO_4$, or a combination thereof, where x is from 1 to 2. This intercalant preferably contains no other acid or oxidizing agent, although one can elect to include some environmentally benign oxidant, such as hydrogen peroxide, $H_2O_2$. Preferably, the intercalant consists of a mixture of a carboxylic acid and an oxidant at a weight ratio of 100:1 to 100:50. The most preferred oxidants are $Li_2FeO_4$, $Na_2FeO_4$, $K_2FeO_4$, and their mixtures.

The layered graphite material may be selected from natural graphite, synthetic graphite, highly oriented pyrolytic graphite, graphite fiber, graphitic nano-fiber, graphite oxide, graphite fluoride, chemically modified graphite, exfoliated graphite, expanded graphite, or a combination thereof.

In one preferred embodiment, the carboxylic acid is selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof.

In another preferred embodiment, the carboxylic acid is selected from the group consisting of saturated aliphatic carboxylic acids of the formula $H(CH_2)_nCOOH$, wherein n is a number of from 0 to 5, selected from formic, acetic, propionic, butyric, pentanoic, hexanoic acids, anhydrides thereof, reactive carboxylic acid derivatives thereof, and combinations thereof.

The intercalated graphite compound may be prepared by an electrochemical reaction which uses the intercalant as both an electrolyte and an intercalate source. Alternatively, the intercalated graphite may be prepared by a chemical oxidation reaction which includes immersing the layered graphite in a liquid medium containing this intercalant.

The present invention also provides a method of producing exfoliated graphite or separate sheets of a graphene material from the intercalated compound described above. The method comprises: (a) preparing this intercalated compound using a chemical oxidation process or electrochemical process, wherein the intercalated compound is in a dry powder form or in a suspension containing the intercalated compound dispersed in a fluid (water, solvent, etc.); and (b) subjecting the suspension to an ultrasonication or mechanical shearing treatment with a desired sonication or shearing intensity for a length of time sufficient for producing separate sheets of graphene, or subjecting the dry intercalated compound powder to a heat exposure at a temperature from 100° C. to 1,500° C. to produce the exfoliated graphite or, directly, separate sheets of graphene.

When the degree of intercalation and/or oxidation is not sufficient and/or the heat exposure temperature is not high enough, one tends to obtain exfoliated graphite (composed of interconnected graphite flakes that remain to be separated). Separate graphene sheets are then subsequently produced by subjecting the exfoliated graphite to an ultrasonication or mechanical shearing treatment. If the degree of intercalation and/or oxidation is sufficiently high and/or the heat exposure temperature is high enough, thermal exposure of the intercalated compound results in not only exfoliation of the graphitic planes, but also separation/isolation of graphene sheets directly. The word "directly" here means thermal exfoliation of an intercalated compound occurs to the extent that the exfoliated flakes are themselves already fully separated from one another and there is no need to go through an additional ultrasonication or mechanical shearing treatment.

The step of separating or isolating the exfoliated graphite (graphite worms) into separate sheets of graphene material may be accomplished by using ultrasonication or a mechanical shearing procedure selected from air jet milling, liquid milling, high-shear mixing, homogenizing, ball milling, rotating-blade mechanical shearing, or a combination thereof.

In one embodiment, the graphene material contains single-layer graphene sheets. Preferably, graphene contains at least 80% single-layer graphene sheets. The graphene material may contain pristine graphene, oxidized graphene with less than 5% oxygen content by weight, graphene fluoride, graphene fluoride with less than 5% fluorine by weight, graphene with a carbon content no less than 95% by weight, or functionalized graphene.

In one embodiment, the heat exposure temperature is from 100° C. to 600° C. In another embodiment, the heat exposure temperature is from 600° C. to 1,200° C.

The method may further comprise a step of compressing the exfoliated graphite or separate sheets of graphene to form a flexible graphite foil or graphene paper product.

We have also found that diluted sulfuric acid (<90% concentration, preferably from 50% to 85%), instead of highly concentrated sulfuric acid, can also be used as an effective intercalate, working in concert with the selected oxidant. Thus, the present invention also provides an intercalated graphite compound for the production of exfoliated graphite, flexible graphite, or nano graphene platelets, wherein the compound comprises a layered graphite with interlayer spaces or interstices and an intercalant residing in at least one of the interstices, and the intercalant comprises a diluted sulfuric acid, having a concentration lower than 90%, and an oxidant selected from $Li_2FeO_4$, $Na_2FeO_4$, $K_2FeO_4$, $Li_xCoO_4$, $Na_xCoO_4$, $K_xCoO_4$, $Li_xNiO_4$, $Na_xNiO_4$, $K_xNiO_4$, or a combination thereof, where x is from 1 to 2.

Also provided is an intercalated graphite compound for the production of exfoliated graphite, flexible graphite, or nano graphene platelets, wherein the compound comprises a layered graphite with interlayer spaces or interstices and an intercalant residing in at least one of said interstices, wherein the intercalant comprises a sulfuric acid, and an oxidant selected from $Li_2FeO_4$, $Na_2FeO_4$, $Li_xCoO_4$, $Na_xCoO_4$, $K_xCoO_4$, $Li_xNiO_4$, $Na_xNiO_4$, $K_xNiO_4$, a combination thereof, or a combination with $K_2FeO_4$, where x is from 1 to 2, and the layered graphite material is selected from synthetic graphite, highly oriented pyrolytic graphite, graphite fiber, graphitic nano-fiber, graphite oxide, graphite fluoride, chemically modified graphite, exfoliated graphite, expanded graphite, or a combination thereof.

BRIEF DESCRIPTION OF THE DRAWINGS

FIG. 3 (A) SEM image of a graphite worm (exfoliated graphite from intercalated compound of natural graphite) and (B) SEM image of graphite worms produced from intercalated artificial graphite.

DETAILED DESCRIPTION OF PREFERRED EMBODIMENTS

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber.

One preferred specific embodiment of the present invention is a method of producing nano graphene platelets (NGPs), also referred to as separate sheets of a graphene material, wherein each graphene sheet/platelet is composed of a graphene plane (single-layer graphene) or multiple graphene planes stacked and bonded together (few-layer graphene, 2-10 planes per multi-layer platelet). Each graphene plane, also referred to as a basal plane, comprises a two-dimensional hexagonal structure of carbon atoms. Each platelet has a length and a width parallel to the graphite plane and a thickness orthogonal to the graphite plane. By definition, the thickness of an NGP is 100 nanometers (nm) or smaller, with a single-sheet NGP being as thin as 0.34 nm. The length and width of a NGP are typically between 200 nm and 20 μm, but could be longer or shorter.

Figure 1:
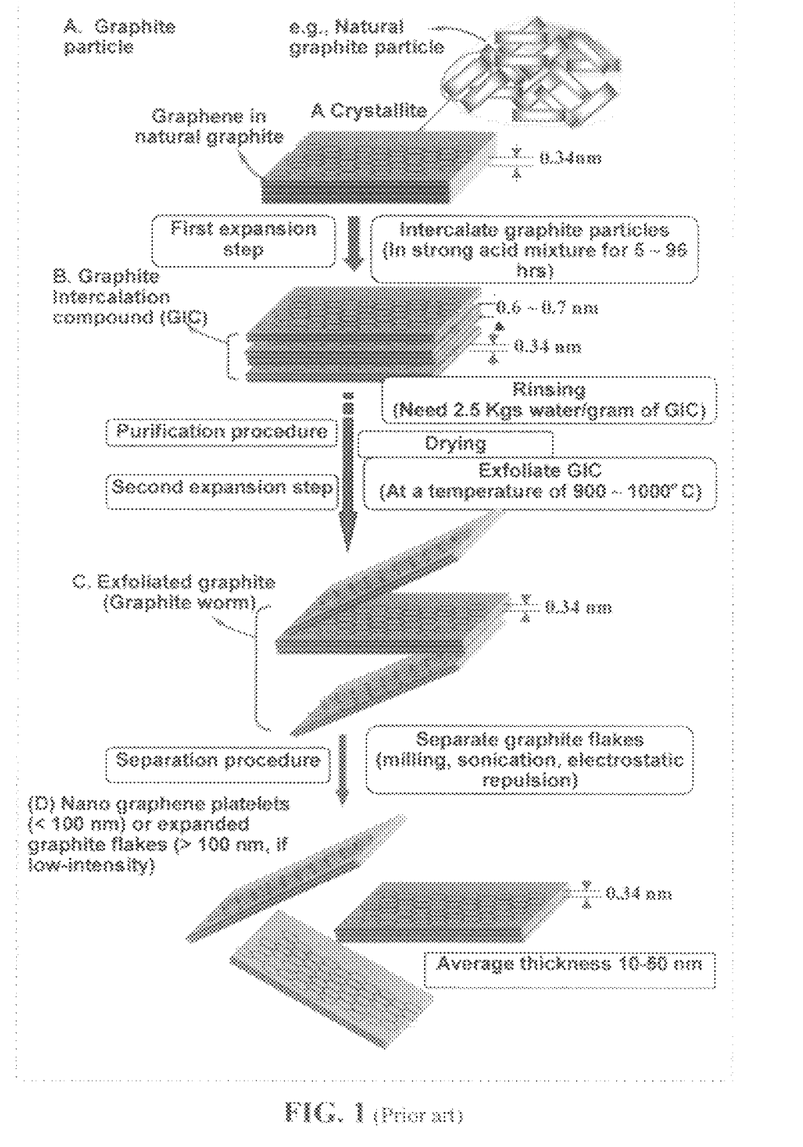
FIG. 1 A flow chart showing the most commonly used prior art process of producing highly oxidized NGPs that entails tedious chemical oxidation/intercalation (using concentrated sulfuric acid and a strong oxidant, such as potassium permanganate), rinsing, and high-temperature exfoliation procedures.

As shown in FIG. 1, the prior art chemical processes typically involve immersing natural graphite powder in a mixture of concentrated sulfuric acid, nitric acid, and an oxidizer, such as potassium permanganate or sodium perchlorate, forming a reacting mass that requires typically 5-120 hours to complete the chemical intercalation/oxidation reaction. Once the reaction is completed, the slurry is subjected to repeated steps of rinsing and washing with water and then subjected to drying treatments to remove water.

The dried powder, referred to as graphite intercalation compound (GIC) or graphite oxide (GO), is then subjected to a thermal shock treatment. This can be accomplished by exposing the GIC to a furnace pre-set at a temperature of typically 800-1100° C. (more typically 950-1050° C.). Alternatively, the GIC or GO may remain dispersed in water and the resulting suspension is subjected to ultrasonication to obtain separate GO sheets dispersed in water. Water can then be removed to recover separate graphene sheets.

It is again critically important to recognize that this prior art approach suffers from the seven (7) major problems described in the Background section. For instance, the GICs obtained by all prior art processes necessarily contain sulfuric acid and nitric acid in the inter-graphene spaces and, hence, necessarily involve the decomposition of $H_2SO_4$ and $HNO_3$ to produce volatile gases (e.g. $NO_x$ and $SO_x$) during their subsequent thermal exfoliation process. The $NO_x$ and $SO_x$ are highly regulated species that can potentially pose some environmental issues. In contrast, our new process does not generate any of these volatile species. In addition, the residual fluid or waste water after the chemical intercalation/oxidation procedure in the prior art process contains undesirable species, such as $Mn^{+2}$, if potassium permanganate is used as an oxidant.

Our new process does not require a mixture of concentrated sulfuric acid and fuming nitric acid and/or potassium permanganate. Dilute acids or weaker acids, such as acetic acid and formic acid, can be a very effective intercalating agent when they are used in conjunction with at least one of the selected oxidants, such as $Li_2FeO_4$, $Na_2FeO_4$, $K_2FeO_4$, $Li_xCoO_4$, $Na_xCoO_4$, $K_xCoO_4$, $Li_xNiO_4$, $Na_xNiO_4$, $K_xNiO_4$, or a combination thereof, where x is from 1 to 2. These are very surprising and have defied the expectations of those who work in exfoliated graphite or graphene industry.

The intercalated graphite compound of the present invention may be prepared from a layered or laminar graphite material using either a chemical oxidation/intercalation or an electrochemical intercalation method.

Figure 3:
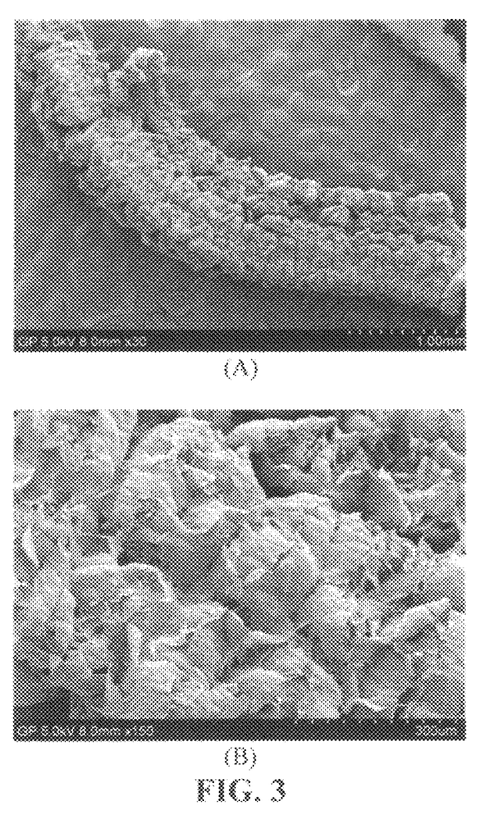

In one preferred embodiment, the intercalated graphite compound may be prepared from a layered or laminar graphite material, using a chemical oxidative reaction. The intercalated compound is then thermally exfoliated to produce exfoliated graphite or graphite worms. The method comprises: (a) forming a carboxylic acid/oxidant-intercalated graphite compound by a chemical oxidation reaction which uses a combination of a carboxylic acid and an oxidant as an intercalate source. The layered graphite is simply immersed in such a mixture at a desired temperature (typically 25-80° C.) for a duration of time sufficient for effecting the chemical oxidation-based intercalation reaction; and (b) rapidly heating the intercalated graphite compound to a high temperature for a desired length of time sufficient for producing exfoliated graphite (e.g., FIG. 3(A)). A typical reaction time with the presently invented intercalant is from 20 minutes to 4 hours; in most cases, less than 1 hour. With a sufficiently high degree of oxidation or a high level of intercalation (e.g. Stage-1 GIC, further discussed later), the resulting intercalated compound, when exposed to a high-temperature shock, can directly become separate graphene sheets.

Figure 4:
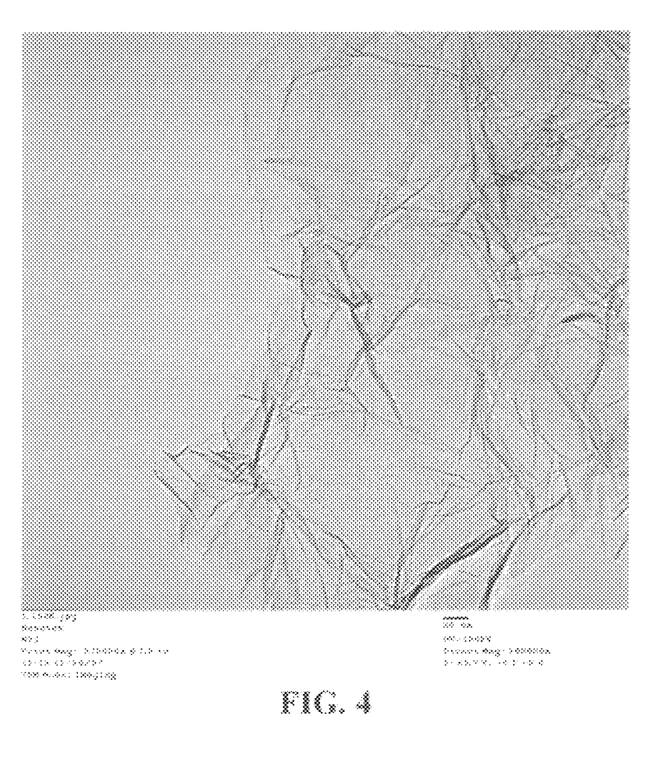
FIG. 4 Transmission electron micrograph of graphene sheets produced by the inventive process.

The resulting exfoliated graphite may be re-compressed to form flexible graphite sheets. Alternatively, the resulting exfoliated graphite may be subjected to a mechanical shearing treatment to produce the desired nano graphene platelets (e.g., FIG. 4(A)). The thermal exfoliation step preferably comprises heating the intercalated graphite to a temperature in the range of 100-1,500° C. for a period of 10 seconds to 2 minutes, most preferably at a temperature in the range of 600-1,100° C. for a period of 30-60 seconds. Quite surprisingly, certain classes of intercalated compounds can be highly exfoliated at a temperature as low as 100-300° C. The exfoliation step in the instant invention does not involve the evolution of undesirable species, such as $NO_x$ and $SO_x$, which are common by-products of exfoliating conventional sulfuric or nitric acid-intercalated graphite compounds.

To work with one of the oxidants selected (e.g. $Li_2FeO_4$, $Na_2FeO_4$, $K_2FeO_4$, $Li_xCoO_4$, $Na_xCoO_4$, $K_xCoO_4$, $Li_xNiO_4$, $Na_xNiO_4$, $K_xNiO_4$, or a combination thereof, where x is from 1 to 2), the carboxylic acid, containing only C, H, and O atoms, may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. Preferably, the carboxylic acid is selected from the group consisting of saturated aliphatic carboxylic acids of the formula $H(CH_2)_nCOOH$, wherein n is a number of from 0 to 5, including formic, acetic, propionic, butyric, pentanoic, and hexanoic acids, anydrides thereof, reactive carboxylic acid derivatives thereof, and combinations thereof. In place of the carboxylic acids, the anhydrides or reactive carboxylic acid derivatives, such as alkyl esters, can also be employed. Representative alkyl esters are methyl formate and ethyl formate. The most preferred carboxylic acids are formic acid and acetic acid, which work very well with any of the aforementioned oxidants. Di-carboxylic acids, such as malic acid, also work very well with the selected oxidant.

Representative dicarboxylic acids are aliphatic dicarboxylic acids having 2-12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. Representative of alkyl esters are dimethyl oxylate and diethyl oxylate. Representative cycloaliphatic acids are cyclohexane carboxylic acid, and useful aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Among the polycarboxylic acids, citric acid is preferred due to its availability and low cost.

The carboxylic acid/oxidant-intercalated graphite can be easily exfoliated by rapidly heating the intercalated graphite compound to a desired exfoliation temperature. An advantage of such a GIC in comparison with the prior art GICs is that only H, C and O are released into the atmosphere during the exfoliation process. Depending on the applied current density and the reaction time, an expansion volume of from 100-500 ml/g, at a thermal exfoliation temperature of 100-1,200° C., and volatile content of 10-20 wt %, could be obtained. In many cases, exfoliation occurs to the extent that graphene sheets are fully separated. The residual sulfur content in the expanded graphite is no more than the sulfur impurity level (if any) of the original graphite flakes since the process is totally sulfur free, as opposed to more than 1,000 ppm of sulfur typically found in conventional exfoliated graphite manufactured from a sulfuric acid-intercalated GIC. Furthermore, the exfoliated graphite and subsequent NGPs do not contain additional corrosive species such as chlorine, fluorine, nitrogen, and phosphor.

The layered graphite material may be selected from natural graphite, synthetic graphite, highly oriented pyrolytic graphite, graphite fiber, graphitic nano-fiber, graphite oxide, graphite fluoride, chemically modified graphite, graphite intercalation compound, exfoliated graphite, or a combination thereof. An extensive investigation that covers a wide array of layered graphite materials and oxidant/carboxylic acid combination leads to the significant and unexpected discovery that $Li_2FeO_4$, $Na_2FeO_4$, and $K_2FeO_4$, are all more effective than other oxidants, such as $H_2O_2$ and $KMnO_4$, and that mixtures of these oxidants are often more effective than a single oxidant alone.

The mechanical shearing treatment, used to further separate graphite flakes and possibly reduce the flake size, preferably comprises using air milling (including air jet milling), ball milling, mechanical shearing (including rotating blade fluid grinding), any fluid energy based size-reduction process, ultrasonication, or a combination thereof.

We have found that the invented chemical intercalation (using a carboxylic acid and an oxidant selected from $Li_2FeO_4$, $Na_2FeO_4$, $K_2FeO_4$, $Li_xCoO_4$, $Na_xCoO_4$, $K_xCoO_4$, $Li_xNiO_4$, $Na_xNiO_4$, $K_xNiO_4$, or a combination thereof, where x is from 1 to 2) and thermal exfoliation mostly led to the formation of NGPs with an average thickness smaller than 2 nm; in many cases, single-layer graphene sheets are formed directly. Incomplete intercalation with higher-order aliphatic carboxylic acids of the formula $H(CH_2)_nCOOH$ (with n greater than 2; i.e., butyric, pentanoic, and hexanoic acids) or with dicarboxylic acids and polycarboxylic acids could lead to the formation of NGPs with an average thickness greater than 2 nm, but smaller than 10 nm. However, single-layer graphene sheets can be readily produced via thermal exfoliation alone (without a subsequent mechanical shearing) if the intercalation/oxidation treatment is conducted to reach full intercalation (Stage-1 GIC) or complete oxidation.

Figure 2:
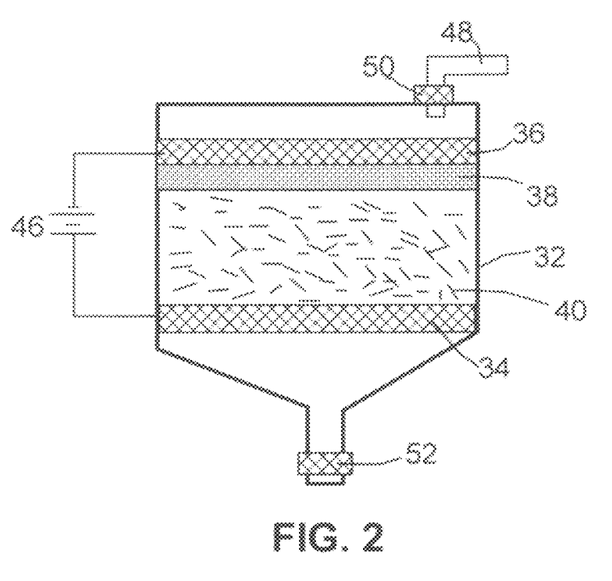
FIG. 2 Schematic of an electrochemical oxidation/intercalation apparatus.

In one preferred embodiment, the graphite intercalation compound may be prepared from a layered or laminar graphite material using an electrochemical intercalation method. Schematically shown in FIG. 2 is an apparatus that can be used for electrochemical intercalation of a layered graphite material according to a preferred embodiment of the present invention. The apparatus comprises a container 32 to accommodate electrodes and electrolyte. The anode is comprised of multiple graphite particles 40 that are dispersed in an electrolyte (e.g., a carboxylic acid+an oxidant, both being also an intercalate) and are supported by a porous anode supporting element 34, preferably a porous metal plate, such as platinum or lead. The graphite particles 40 preferably form a continuous electron path with respect to the anode support plate 34, but are accessible to the intercalate. An electrically insulating, porous separator plate 38 (e.g., Teflon fabric or glass fiber mat) is placed between the anode and the cathode 36 (e.g., a porous graphite or metal plate) to prevent internal short-circuiting. A DC current source 46 is used to provide a current to the anode support element 34 and the cathode 36. The imposing current used in the electrochemical reaction preferably provides a current density in the range of 50 to 600 $A/m^2$, most preferably in the range of 100 to 400 $A/m^2$. Fresh electrolyte (intercalate) may be supplied from an electrolyte source (not shown) through a pipe 48 and a control valve 50. Excess electrolyte may be drained through a valve 52.

Hence, in another preferred embodiment, an electrochemical method has been developed for converting a layered or laminar graphite material to an intercalated graphite compound, which can then be converted to either a flexible graphite product or nano graphene platelets having an average thickness smaller than 10 nm, more often smaller than 5 nm, and most often single-layer graphene. The method comprises (a) forming a carboxylic acid/oxidant-intercalated graphite compound by an electrochemical reaction which uses a carboxylic acid as both an electrolyte and an intercalate source, the layered graphite material as an anode material, and a metal or graphite as a cathode material, and wherein a current is imposed upon the cathode and the anode at a current density for a duration of time sufficient for effecting the electrochemical reaction; and (b) exposing the intercalated graphite compound to a thermal shock to produce exfoliated graphite. The exfoliation step preferably comprises heating the intercalated graphite to a temperature in the range of 100-1,500° C. for a duration of 10 seconds to 2 minutes, most preferably at a temperature in the range of 100-600° C. for a duration of 30-60 seconds. Again, the exfoliation step in the instant invention does not involve the evolution of undesirable species, such as $NO_x$ and $SO_x$, which are common by-products of exfoliating conventional sulfuric or nitric acid-intercalated graphite compounds.

The exfoliated graphite may be compressed into flexible graphite sheets. Alternatively, the exfoliated graphite may be subjected to a mechanical shearing treatment to produce the desired nano graphene platelets (separate graphene sheets).

It may be noted that, in a traditional GIC obtained by intercalation of a laminar graphite material, the intercalant species may form a complete or partial layer in an inter-layer space or gallery. If there always exists one graphene layer between two intercalant layers, the resulting graphite is referred to as a Stage-1 GIC. If n graphene layers exist between two intercalant layers, we have a Stage-n GIC. Carboxylic acid-intercalated graphite compounds were found to be stage-2, stage-3, stage-4, or stage-5, depending on the type of carboxylic acid used. It is generally believed that a necessary condition for the formation of all single-sheet NGPs is to have a perfect Stage-1 GIC for exfoliation. Even with a Stage-1 GIC, not all of the graphene layers get exfoliated for reasons that remain unclear. Similarly, exfoliation of a Stage-n GIC (with n>5) tends to lead to a wide distribution of NGP thicknesses (mostly much greater than n layers). In other words, exfoliation of Stage-5 GICs often yields NGPs much thicker than 10 or 20 layers. Only Stage-1 GICs, when thermally exfoliated, can lead to all single-layer graphene sheets. Hence, a major challenge in the art is to be able to consistently produce NGPs with well-controlled dimensions (ultra-thin, such as all single-layer) from sulfuric acid-intercalated graphite.

It has been a slow and challenging process to use sulfuric acid or a carboxylic acid, in conjunction with various different types of oxidants (e.g. $KMnO_4$, $NaClO_3$, and $H_2O_2$, etc.), to produce all stage-1 GICs or completely oxidized graphite, which can lead to essentially all single-layer graphene sheets. Even with highly concentrated sulfuric acid and a powerful oxidant such as $KMnO_4$ and $NaClO_3$, it normally takes 5-120 hours (mostly 6-96 hours) to obtain all stage-1 GICs or completely oxidized graphite. These stage-1 GICs or completely oxidized graphite samples exhibit complete disappearance of the X-ray diffraction peak at 2θ=26 degrees, corresponding to an inter-graphene plane spacing of 0.34 nm characteristic of the untreated natural graphite.

In this context, it is surprising for us to discover the following results:
1) It takes only from 20 minutes 4 hours (mostly much shorter than 1 hour) for the presently invented intercalant (a carboxylic acid mixed with an oxidant selected from $Li_2FeO_4$, $Na_2FeO_4$, $K_2FeO_4$, $Li_xCoO_4$, $Na_xCoO_4$, $K_xCoO_4$, $Li_xNiO_4$, $Na_xNiO_4$, $K_xNiO_4$, or a combination thereof) to fully intercalate into a wide variety of layered graphitic materials for forming Stage-1 GICs or fully oxidized graphite using either a chemical oxidation or electrochemical intercalation procedure.

2) A broad array of layered graphitic materials, not just natural graphite, can be effectively converted into Stage-1 GICs or fully oxidized graphite. These include natural graphite, synthetic graphite, highly oriented pyrolytic graphite, graphite fiber, graphitic nano-fiber, graphite oxide, graphite fluoride, chemically modified graphite, exfoliated graphite, expanded graphite, or a combination thereof. This is also unexpected since many of the graphitic materials have a hard-carbon skin (e.g. artificial graphite) or graphene-layer skin (e.g. carbon or graphite fibers) that are resistant to penetration by any intercalant. It seems that the presence of the type of oxidants herein selected can act to remove or break into this hard skin layer, enabling both the carboxylic acid and oxidant to rapidly diffuse into the internal structure of a graphitic material (typically in less than 1 hour). This is quite a technological achievement.

It has been commonly believed that a combination of a presumably strong oxidant (such as $KMnO_4$ and $NaClO_3$, perceived to be extremely strong and powerful) and a strong intercalate (such as concentrated sulfuric acid, alone or in combination with nitric acid) is required to obtain a proper graphite intercalation compound (GIC) or graphite oxide (GO). This belief has been based on the notion that sulfuric acid serves as a powerful intercalate that easily penetrates into inter-graphene spaces and stays therein when the intercalation/oxidation procedure is completed and the powder is recovered by drying. In the meantime, the oxidizing agent serves to oxidize the edge and then the interior of graphene planes, effectively increasing the inter-graphene space or opening up the space to facilitate the entry of sulfuric acid. The interstitial sulfuric acid keeps the space open, allowing the oxidizing agent to further oxidize the graphene planes. In other words, concentrated sulfuric acid and the strong oxidizer are believed to work in a concerted manner to enable the intercalation and oxidation and both a perceived strong intercalate and a strong oxidizer are indispensible. The present invention defies this expectation in many aspects: (a) Weaker acids (e.g. acetic acid) and presumably weaker oxidizer (e.g. $Na_2FeO_4$) work very well and, actually, are more effective; (b) Environmentally benign acids, such as formic acid and carboxylic acid, can be very effective.

3) In many cases, a mixture of two oxidizers is more effective than single component working alone. This synergism is absolutely unexpected.

4) In the prior art process, upon removal of excess chemicals, the recovered or dried powder is graphite intercalation compound (GIC) or graphite oxide (GO). The residual chemicals (sulfuric acid and nitric acid) in the dried GIC powder get thermally decomposed during the subsequent high-temperature treatment (heat shock exposure), resulting in the formation of volatile gases in the inter-graphene spaces. These gases, under a high temperature, produce very high pressures that push open graphene planes (expansion and exfoliation). If sulfuric acid and nitric acid are present in the GICs, the volatile gases contain highly regulated species, such as $NO_x$ and $SO_x$. This is more than just a cost issue, but a larger environmental and societal issue and an industrial scalability issue. The significance of our surprising discovery to use environmentally benign intercalating agents should not be underestimated or ignored.

5) Under comparable conditions (same temperatures, same acid/oxidant combination and ratio, etc.), electrochemical reaction is a lot faster than chemical reaction to complete the needed oxidation/intercalation level. This is applicable to both the instant carboxylic acid/oxidant combinations and the conventional sulfuric acid/oxidant combinations.

The presently invented process is capable of producing single-layer graphene sheets (essentially 100% being single-layer graphene if intercalation/oxidation is complete). In all cases, the graphene material produced contains at least 80% single-layer graphene sheets. The graphene produced can contain pristine graphene, oxidized graphene with less than 5% oxygen content by weight, graphene fluoride, graphene oxide with less than 5% fluorine by weight, graphene with a carbon content no less than 95% by weight, or functionalized graphene.

After an extensive and in-depth study, we have discovered that the presently invented method is applicable to both sulfuric acid and carboxylic acid when each acid is used in conjunction with an oxidant selected from $Li_2FeO_4$, $Na_2FeO_4$, $K_2FeO_4$, $Li_xCoO_4$, $Na_xCoO_4$, $K_xCoO_4$, $Li_xNiO_4$, $Na_xNiO_4$, $K_xNiO_4$, or a combination thereof. Thus, the invention also claims a method of producing exfoliated graphite or separate sheets of a graphene material from an intercalated graphite compound. This method comprises: (a) preparing this intercalated graphite compound from a layered graphite material using an electrochemical reaction which uses an intercalant as both an electrolyte and an intercalate source, wherein the layered graphite material is selected from natural graphite, synthetic graphite, highly oriented pyrolytic graphite, graphite fiber, graphitic nano-fiber, graphite oxide, graphite fluoride, chemically modified graphite, exfoliated graphite, expanded graphite, or a combination thereof, and said intercalant contains an acid and an oxidant selected from $Li_2FeO_4$, $Na_2FeO_4$, $K_2FeO_4$, $Li_xCoO_4$, $Na_xCoO_4$, $K_xCoO_4$, $Li_xNiO_4$, $Na_xNiO_4$, $K_xNiO_4$, or a combination thereof; (b) bringing the intercalated graphite compound in a dry powder form or in a suspension containing the intercalated compound dispersed in a fluid; and (c) subjecting the suspension to an ultrasonication or mechanical shearing treatment with a desired sonication or shearing intensity for a length of time sufficient for producing separate sheets of graphene, or exposing the dry intercalated graphite compound powder to a heat shock at a temperature from 100° C. to 1,500° C. to produce the exfoliated graphite or, directly, the separate sheets of graphene. This acid can be a sulfuric acid and/or a carboxylic acid.

The following examples serve to provide the best modes of practice for the present invention and should not be construed as limiting the scope of the invention:

EXAMPLE 1

Preparation of $Na_2FeO_4$/Formic Acid-Intercalated Graphite and Nano Graphene Platelets (NGPs) from Meso-Phase Micro-Beads (MCMBs)

Two grams of MCMBs of approximately 6 μm in size, were immersed in a mixture of 2 L of formic acid and 0.1 L of $Na_2FeO_4$ at room temperature for 20 minutes to 2 hours. Following the chemical oxidation/intercalation treatment, the resulting intercalated MCMBs were washed with water and dried. The resulting product is a formic acid/$Na_2FeO_4$- intercalated graphite compound. We found that a period of time as short as 20 minutes was sufficient for complete intercalation Subsequently, the intercalated graphite compounds were transferred to a furnace pre-set at a temperature of 150-600° C. for 30-90 seconds. Even at a temperature as low as 250° C., all of the intercalated compounds (regardless of the length of intercalation time) were found to induce extremely rapid and high expansions of graphite crystallites to the extent that essentially all intercalated compound particles are fully exfoliated and directly separated into single-layer graphene. Approximately one half of these NGPs were then subjected to compression with a pair of counter-rotating rollers to produce a layer of graphene paper. We discovered that such a graphene paper is more conductive than the graphene paper produced by the conventional method using sulfuric acid/$KMnO_4$ intercalant (e.g. 3,350 S/cm vs. 1,450 S/cm).

COMPARATIVE EXAMPLE 1a

Hydrogen Peroxide-Assisted, Formic Acid-Intercalated Graphite and Nano-Scaled Graphene Platelets (NGPs) from MCMBs The same procedure and starting material as in Example 1 was followed to prepare a formic acid/$H_2O_2$-intercalated graphite compound, but for an intercalation time as long as 12 hours. Subsequently, the intercalated compound was transferred to a furnace pre-set at a temperature of 600° C. for 60 seconds. The compound was found to induce rapid and high expansions of graphite crystallites with an expansion ratio of greater than 200; the product being exfoliated graphite worms (not separated graphene sheets). Further separation of exfoliated graphite worms was conducted by using a Cowles high-shearing device. The thickness of individual graphene platelets ranged from two graphene sheets to approximately 45 graphene sheets (average of 24 sheets or approximately 8 nm) based on SEM and TEM observations. It is clear that the mixture of hydrogen peroxide and formic acid is significantly less effective than the mixture of $Na_2FeO_4$ and formic acid as an intercalant for the purpose of producing ultra-thin graphene sheets.

COMPARATIVE EXAMPLE 1b

Sulfuric/Nitric Acid-Intercalated Meso-Phase Micro-Beads (MCMBs)

One gram of MCMBs as used in Example 1 were intercalated with a mixture of sulfuric acid, nitric acid, and potassium permanganate at a weight ratio of 4:1:0.05 (graphite-to-intercalate ratio of 1:3) for four hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exfoliated at 800° C. for 45 seconds. A sample of formic acid/$Na_2FeO_4$-intercalated graphite prepared in Example 1 was also exfoliated at 800° C. for 45 seconds. The sulfuric acid-intercalated compound, upon exfoliation, was subjected to a mechanical shearing treatment using a Cowles rotating blade device for 30 minutes. The resulting NGPs were examined using SEM and TEM to measure NGP thickness. The average thickness of NGPs is approximately 3.5 nm. In contrast, the formic acid/$Na_2FeO_4$-intercalated graphite compound was directly exfoliated into essentially all single-layer graphene sheets (0.34 nm thick) without the need to undergo a subsequent mechanical shearing.

EXAMPLE 2

NGPs from Natural Graphite Flakes Intercalated with a Mixture of Acetic Acid and $K_2FeO_4$, Acetic Acid and $Li_2FeO_4$, and a Series of Mixtures of Acetic Acid and $K_2FeO_4+Li_2FeO_4$ (with a $K_2FeO_4/Li_2FeO_4$ Mole Ratio from 1/10 to 10/1).

Figure 5:
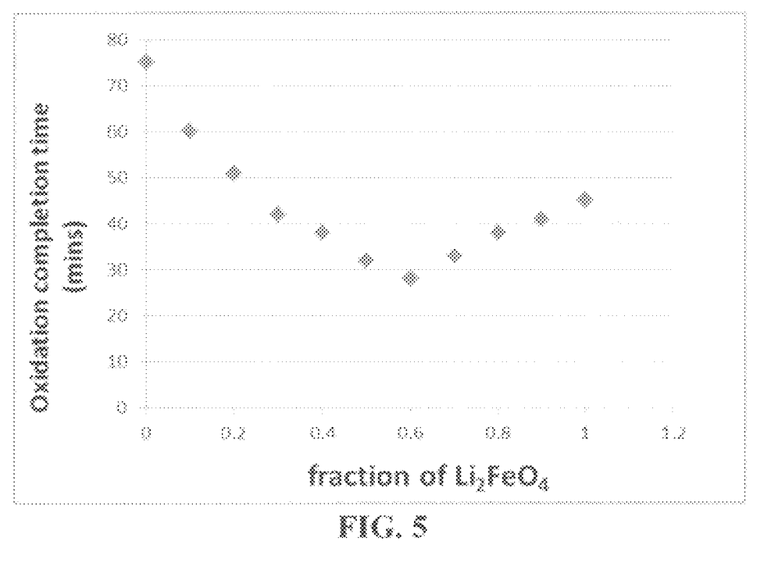
FIG. 5 The oxidation completion time plotted as a function of the molar ratio between $Li_2FeO_4$ and $K_2FeO_4$, for the series of acetic acid/oxidant-intercalated graphite compounds.

Two grams of natural flake graphite having a particle size of approximately 6 μm were subjected to the same chemical oxidative intercalation conditions described in Example 1, with formic acid replaced by acetic acid and reaction temperature at 45° C. The degree of intercalation was monitored intermittently at different time intervals using X-ray diffraction (size reduction and shifting of the diffraction curve peak at approximately $2\theta=26$ degrees), optical microscopy, and visual inspection (e.g. color change from dark to yellow-brown as oxidation progresses). The length of time when the peak at $2\theta=26$ degrees is defined as the oxidation completion time. The data of oxidation completion times are summarized in FIG. 5. Several observations can be made from these data, which are highly surprising:

1) The intercalant containing acetic acid and $Li_2FeO_4$ alone (no $K_2FeO_4$) is more effective than the intercalant containing acetic acid and $K_2FeO_4$ alone (no $LiFeO_4$).
2) Both $Li_2FeO_4$ and $K_2FeO_4$ are very effective promoters of oxidation of graphite and/or intercalation of graphite by acetic acid, an otherwise very weak acid.
3) There is a synergistic effect between $Li_2FeO_4$ and $K_2FeO_4$, with some of their mixtures enabling oxidation completion times that are lower than those of either oxidant component alone.

Following the intercalation treatment, the resulting intercalated flakes were washed with water and dried. Then, the intercalated compound was transferred to a furnace pre-set at a temperature of 500° C. for 45 seconds. The compound was found to induce extremely rapid and full exfoliation of graphite crystallites to form graphene sheets directly (average of 5 graphene planes or approximately 1.8 nm thick) based on SEM and TEM observations.

COMPARATIVE EXAMPLE 2

NGPs from Natural Graphite Flakes Intercalated with a Mixture of Acetic Acid and Hydrogen Peroxide Two grams of natural flake graphite having a particle size of approximately 6 μm were subjected to the same chemical oxidative intercalation conditions described in Example 1, with formic acid replaced by acetic acid and for an intercalation time of 12 hours. Following the intercalation treatment, the resulting intercalated flakes were washed with water and dried. Then, the intercalated compound was transferred to a furnace pre-set at a temperature of 500° C. for 45 seconds. The compound was found to form graphite worms, which after a mechanical shearing treatment in a laboratory-scale Cowles rotating blade device for 15 minutes, resulted in the formation of NGPs. These graphene platelets exhibit a thickness ranging from three graphene sheets to approximately 50 graphene sheets (average of 25 sheets or approximately 8.5 nm) based on SEM and TEM observations.

EXAMPLE 3

Interaction of Natural Graphite by Mixtures of $Na_2FeO_4$ and a Carboxylic Acid, $H(CH_2)_nCOOH$, Wherein n is a Number from 0 to 5, Corresponding to Formic, Acetic, Propionic, Butyric, Pentanoic, and Hexanoic Acids Particles of natural graphite having an average size of 7 μm were intercalated by using a 1/1 molar ratio of $Na_2FeO_4$ and a carboxylic acid at 50° C. for a duration of time until complete oxidation/intercalation is achieved. This required time for completion was recorded. Upon completion of the reaction, the mixture was poured into deionized water and filtered. The sample was then repeatedly rinsed with deionized water until the pH of the filtrate was approximately 6. The slurry was spray-dried and stored in a vacuum oven at 40° C. for 24 hours. The interlayer spacing of the resulting laminar graphite oxide was determined by the Debye-Scherrer X-ray technique to be approximately 0.85-0.93 nm (8.5-9.3 Å), indicating that graphite has been converted into graphite oxide or fully intercalated for all samples. The required oxidation times for the samples containing formic, acetic, propionic, butyric, pentanoic, and hexanoic acids (and $Na_2FeO_4$ in each intercalant) are 44, 58, 88, 126, 173, and 230 minutes, respectively. For comparison, a series of samples (with $Na_2FeO_4$ replaced by $H_2O_2$) were also investigated. The required oxidation times were found to be 12, 36, 66, 95, and 120 hours, respectively. The differences are dramatic and unexpected.

EXAMPLE 4

NGPs from Citric Acid/Oxidant-Intercalated Short Carbon Fiber Segments

Graphite fibers chopped into segments with 0.2 mm or smaller in length were immersed in a mixture of citric acid (a representative example of polycarboxylic acid) and $Na_2CoO_4$ (also hydrogen peroxide, as a comparative example) at an acid-to-oxidizer ratio of 10:2 at 60° C. for 36 hours. The diameter of carbon fibers was approximately 12 μm. After intercalation and exfoliation at 600° C. for 30 seconds, the platelets exhibit an average thickness of 3 nm (sample with $Na_2CoO_4$) and 18 nm (sample with $H_2O_2$), respectively. Apparently, $Na_2CoO_4$ is more effective than $H_2O_2$ in pairing up with citric acid to intercalate carbon fibers.

EXAMPLE 5

NGPs from Carbon Nano-Fibers (CNFs)

Figure 6:
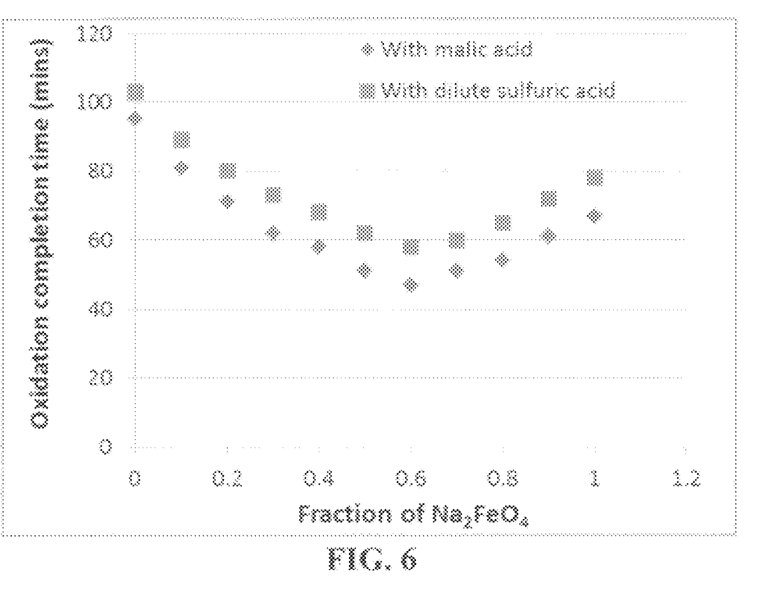
FIG. 6 The oxidation completion time plotted as a function of the molar ratio between $Na_2FeO_4$ and $K_2FeO_4$, for the two series of malic acid/oxidant- and diluted sulfuric acid/oxidant-intercalated graphite compounds.

A powder sample of carbon nano-fibers was supplied from Applied Science, Inc. (ASI), Cedarville, Ohio. Approximately 2 grams of CNFs were subjected to intercalations by two series of acid-oxidant combinations: malic acid-$Na_2FeO_4$/$K_2FeO_4$ and diluted sulfuric acid-$Na_2FeO_4$/$K_2FeO_4$. In FIG. 6, the oxidation completion times are plotted as a function of the molar ratio between $Na_2FeO_4$ and $K_2FeO_4$, for the two series of malic acid/oxidant and diluted sulfuric acid/oxidant intercalated graphite compounds. Several observations can be made from these data, which are highly surprising:
1) The intercalant containing malic acid (a di-carboxylic acid) and $Na_2FeO_4$ alone (no $K_2FeO_4$) is more effective than the intercalant containing malic acid and $K_2FeO_4$ alone (no $NaFeO_4$).
2) Both $Na_2FeO_4$ and $K_2FeO_4$ are very effective promoters of oxidation and/or intercalation of graphite by malic acid, an otherwise very weak acid.
3) There is a synergistic effect between $Na_2FeO_4$ and $K_2FeO_4$, with some of their mixtures enabling oxidation completion times that are lower than those of either oxidant component alone. This is applicable to both malic acid and diluted sulfuric acid as an intercalate.
4) Malic acid is more effective than diluted sulfuric acid (50-85% in water) in intercalating CNFs.

EXAMPLE 6

Electrochemical Intercalation of Meso-Phase Micro-Beads (MCMBs)

One gram of MCMB particles, approximately 6 μm or less in sizes, were used as the anode material and 1,000 mL of formic acid (mixed with $Na_2FeO_4$ or $Na_2NiO_4$) was used as the electrolyte and intercalate source. The anode supporting element is a platinum plate and the cathode is a graphite plate of approximately 4 cm in diameter and 0.2 cm in thickness. The separator, a glass fiber fabric, was used to separate the cathode plate from the MCMB particles and to compress the MCMB particles down against the anode supporting element to ensure that the MCMBs are in electrical connection with the anode supporting element to serve as the anode. The electrodes, electrolyte, and separator are contained in a Buchner-type funnel to form an electrochemical cell. The anode supporting element, the cathode, and the separator are porous to permit intercalate (electrolyte) to saturate the graphite particles and to pass through the cell from top to bottom.

The MCMB particles were subjected to an electrolytic oxidation treatment at a current of 0.5 amps (current density of about 0.04 amps/cm$^2$) and at a cell voltage of about 4-6 volts for 0.5-2 hours. These values may be varied with changes in cell configuration and makeup. Typically, it takes approximately from 45 minutes to 70 minutes using either $Na_2FeO_4$ or $Na_2NiO_4$ to complete the intercalation/oxidation process. Following electrolytic treatment, the resulting intercalated particles were washed with water and dried.

Subsequently, the intercalated compound was transferred to a furnace pre-set at a temperature of 600° C. for 30 seconds. The compound was found to induce extremely rapid and high expansions of graphite crystallites, resulting in essentially full separation of single layer graphene sheets.

EXAMPLE 7

Natural Graphite Flakes Electrochemically Intercalated with Acetic Acid/$K_2FeO_4$ One gram of natural flake graphite having an average particle size of 14 μm was subjected to the same electrochemical intercalation conditions described in Example 6, with formic acid replaced by acetic acid. The graphite flakes were subjected to an electrolytic oxidation treatment at a current of 0.5 amps (current density of about 0.04 amps/cm$^2$) and at a cell voltage of about 6 volts for 0.5-1.2 hours. Following the electrolytic treatment, the resulting intercalated flake was washed with water and dried. Subsequently, the intercalated compound was transferred to a furnace pre-set at a temperature of 500° C. for 45 seconds. The compound was found to induce extremely rapid and high expansions, exfoliation, and separation of graphene sheets (>80% being single-layer graphene with some few-layer graphene sheets from 2-9 layers).

We have also carried out some comparative experiments using a range of oxidants in conjunction with a range of acids (even including sulfuric acid) and found that, in general, electrochemical intercalation/oxidation is a lot faster than corresponding chemical intercalation/oxidation. For instance, under comparable conditions, it took 1-3 hours for the same acetic acid/$K_2FeO_4$ intercalant to complete the intercalation/oxidation using chemical reaction process, in contrast to the 0.5-1.2 hours reported above for the electrochemical reaction-based process. The same trend also holds true for sulfuric acid/$KMnO_4$ intercalants.

EXAMPLE 8

NGPs from Electrochemically Intercalated Short Carbon Fiber Segments with Malic Acid/$Na_2FeO_4$ The procedure was similar to that used in Example 6, but the starting material was graphite fibers chopped into segments with 0.2 mm or smaller in length prior to electrochemical intercalation. The diameter of carbon fibers was approximately 12 μm. The intercalants were selected from "malic acid+$Na_2FeO_4$" and "dilute sulfuric acid+$Na_2FeO_4$". After electrochemical intercalation and subsequent exfoliation at 600° C. for 30 seconds, the platelets were found to exhibit mostly single-layer graphene for the compound intercalated with malic acid/$Na_2FeO_4$ and mostly few-layer graphene (thickness of 2 nm) for the compound intercalated with dilute sulfuric acid/$Na_2FeO_4$. Similar procedures were followed to intercalate graphite fluoride and oxidized graphite particles.

The invention claimed is:

1. An intercalated graphite compound for the production of exfoliated graphite, flexible graphite, or nano graphene platelets, said compound comprising a layered graphite with interlayer spaces or interstices and an intercalant or its component ions residing in at least one of said interstices, wherein said intercalant is sulfuric acid-free and comprises a carboxylic acid and an oxidant selected from the group consisting of $Li_2FeO_4$, $Na_2FeO_4$, $Li_xCoO_4$, $Na_xCoO_4$, $K_xCoO_4$, $Li_xNiO_4$, $Na_xNiO_4$, $K_xNiO_4$, and combinations thereof, where x is from 1 to 2.

2. The intercalated graphite compound of claim 1 wherein said layered graphite material is selected from the group consisting of natural graphite, synthetic graphite, highly oriented pyrolytic graphite, graphite fiber, graphitic nano-fiber, graphite oxide, graphite fluoride, chemically modified graphite, exfoliated graphite, expanded graphite, and combinations thereof.

3. The intercalated graphite compound of claim 1 wherein said carboxylic acid is selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof.

4. The intercalated graphite compound of claim 1 wherein said carboxylic acid is selected from the group consisting of saturated aliphatic carboxylic acids of the formula $H(CH_2)_nCOOH$, wherein n is a number from 0 to 5, selected from formic, acetic, propionic, butyric, pentanoic, hexanoic acids, anhydrides thereof, reactive carboxylic acid derivatives thereof, and combinations thereof.

5. The intercalated graphite compound of claim 1 wherein the intercalant consists of a mixture of a carboxylic acid and an oxidant at a weight ratio of 100:1 to 100:50.

6. The intercalated graphite compound of claim 1 wherein said intercalant further comprises hydrogen peroxide.

7. The intercalated graphite compound of claim 1, which is prepared by an electrochemical reaction which uses said intercalant as both an electrolyte and an intercalate source.

8. The intercalated graphite compound of claim 1, wherein said intercalated compound is prepared by a chemical oxidation reaction which includes immersing said layered graphite in a liquid medium containing said intercalant.

9. An intercalated graphite compound for the production of exfoliated graphite, flexible graphite, or nano graphene platelets, said compound comprising a layered graphite with interlayer spaces or interstices and an intercalant residing in at least one of said interstices, wherein said intercalant comprises sulfuric acid, and an oxidant selected from the group consisting of $Li_2FeO_4$, $Na_2FeO_4$, $Li_xCoO_4$, $Na_xCoO_4$, $K_xCoO_4$, $Li_xNiO_4$, $Na_xNiO_4$, $K_xNiO_4$, a combination thereof, and combinations with $K_2FeO_4$, where x is from 1 to 2, and said layered graphite material is selected from the group consisting of synthetic graphite, highly oriented pyrolytic graphite, graphite fiber, graphitic nano-fiber, graphite oxide, graphite fluoride, chemically modified graphite, exfoliated graphite, expanded graphite, and combinations thereof.

10. A method of producing exfoliated graphite or separate sheets of a graphene material from the intercalated graphite compound of claim 1, said method comprising:
   a) preparing said intercalated graphite compound using a chemical oxidation process or electrochemical process and making said intercalated graphite compound in a dry powder form or in a suspension containing said intercalated graphite compound dispersed in a fluid; and
   b) subjecting said suspension to an ultrasonication or mechanical shearing treatment with a desired sonication or shearing intensity for a length of time sufficient for producing said separate sheets of graphene, or subjecting said dry intercalated graphite compound powder to a heat exposure at a temperature from 100° C. to 1,500° C. to produce said exfoliated graphite or, directly, said separate sheets of graphene.

11. The method of claim 10, further including a step of separating or isolating said exfoliated graphite into separate sheets of graphene material using ultrasonication or a mechanical shearing procedure selected from the group consisting of air jet milling, liquid milling, high-shear mixing, homogenizing, ball milling, rotating-blade mechanical shearing, and combinations thereof.

12. The method of claim 10 wherein said heat exposure temperature is from 100° C. to 600° C.

13. The method of claim 10 wherein said heat exposure temperature is from 600° C. to 1,200° C.

14. The method of claim 10, further comprising a step of compressing said exfoliated graphite or separate sheets of graphene to form a flexible graphite foil or graphene paper product.

15. The method of claim 10 wherein said graphene contains single-layer graphene sheets.

16. The method of claim 10 wherein said graphene contains at least 80% single-layer graphene sheets.

17. The method of claim 10 wherein said graphene material contains pristine graphene, oxidized graphene with less than 5% oxygen content by weight, graphene fluoride, graphene fluoride with less than 5% fluorine by weight, graphene with a carbon content no less than 95% by weight, or functionalized graphene.

18. A method of producing exfoliated graphite or separate sheets of a graphene material from the intercalated graphite compound of claim 9, said method comprising:
   a) preparing said intercalated graphite compound using a chemical oxidation process or electrochemical reaction process and making said intercalated graphite compound in a dry powder form or in a suspension containing said intercalated graphite compound dispersed in a fluid; and
   b) subjecting said suspension to an ultrasonication or mechanical shearing treatment with a desired sonication or shearing intensity for a length of time sufficient for producing said separate sheets of graphene, or subjecting said dry intercalated graphite compound powder to a heat exposure at a temperature from 100° C. to 1,500° C. to produce said exfoliated graphite or, directly, said separate sheets of graphene.

19. A method of producing exfoliated graphite or separate sheets of a graphene material from an intercalated graphite compound, said method comprising:
   a) preparing said intercalated graphite compound from a layered graphite material using an electrochemical reaction process which uses an intercalant as both an electrolyte and an intercalate source, wherein said layered graphite material is selected from the group consisting of natural graphite, synthetic graphite, highly oriented pyrolytic graphite, graphite fiber, graphitic nano-fiber, graphite oxide, graphite fluoride, chemically modified graphite, exfoliated graphite, expanded graphite, and combinations thereof, and said intercalant contains an acid and an oxidant selected from the group consisting of $Li_2FeO_4$, $Na_2FeO_4$, $Li_xCoO_4$, $Na_xCoO_4$, $K_xCoO_4$, $Li_xNiO_4$, $Na_xNiO_4$, $K_xNiO_4$, and combinations thereof, where x is from 1 to 2;
   b) bringing said intercalated graphite compound into a dry powder form or a suspension containing said intercalated graphite compound dispersed in a fluid; and
   c) subjecting said suspension to an ultrasonication or mechanical shearing treatment with a desired sonication or shearing intensity for a length of time sufficient for producing said separate sheets of graphene, or exposing said dry intercalated graphite compound powder to a heat treatment at a temperature from 100° C. to 1,500° C. to produce said exfoliated graphite or, directly, said separate sheets of graphene.

20. The method of claim 19, wherein said acid is selected from sulfuric acid or a mixture of sulfuric acid and a carboxylic acid.

* * * * *